United States Patent
Bastide et al.

(10) Patent No.: US 10,095,740 B2
(45) Date of Patent: Oct. 9, 2018

(54) SELECTIVE FACT GENERATION FROM TABLE DATA IN A COGNITIVE SYSTEM

(71) Applicant: International Business Machines Corporation, Armonk, NY (US)

(72) Inventors: Paul R. Bastide, Boxford, MA (US); Matthew E. Broomhall, Goffstown, NH (US); Donna K. Byron, Petersham, MA (US); Robert E. Loredo, North Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 628 days.

(21) Appl. No.: 14/834,810

(22) Filed: Aug. 25, 2015

(65) Prior Publication Data
US 2017/0060945 A1      Mar. 2, 2017

(51) Int. Cl.
*G06F 7/00*      (2006.01)
*G06F 17/30*      (2006.01)

(52) U.S. Cl.
CPC .... *G06F 17/30463* (2013.01); *G06F 17/3043* (2013.01); *G06F 17/3053* (2013.01); *G06F 17/30684* (2013.01)

(58) Field of Classification Search
None
See application file for complete search history.

(56) References Cited

U.S. PATENT DOCUMENTS

| | | | |
|---|---|---|---|
| 4,688,195 A | 8/1987 | Thompson et al. |
| 5,491,700 A | 2/1996 | Wright et al. |
| 6,128,297 A | 10/2000 | Reumerman et al. |

(Continued)

FOREIGN PATENT DOCUMENTS

| | | |
|---|---|---|
| JP | 05334490 | 12/1993 |
| JP | 2010134709 A | 6/2010 |

(Continued)

OTHER PUBLICATIONS

"About Semantic Table", Semantic Table.org, Bioinformatics and Systems Engineering (BASE) division, RIKEN, http://semantictable.org, accessed on Oct. 25, 2012, 1 page.

(Continued)

*Primary Examiner* — Uyen Le
(74) *Attorney, Agent, or Firm* — Stephen J. Walder, Jr.; Reza Sarbakhsh

(57) ABSTRACT

Mechanisms are provided for ingesting natural language textual content. Ingestion of natural language textual content is initiated and an embedded structured data portion within the natural language textual content is identified. A signature of the structured data portion is generated which comprises one or more metadata elements describing the configuration or content of the structured data portion. References to the structured data portion are identified in natural language text portions of the natural language textual content and evaluated based on the signature. An ingestion prioritization plan for ingesting a set of facts associated with a set of elements of the structured data portion is generated based on results of the evaluation. The ingestion prioritization plan is applied to generate the set of facts and store the set of facts in an ingested representation of the natural language textual content.

20 Claims, 5 Drawing Sheets

(56) References Cited

U.S. PATENT DOCUMENTS

| | | | |
|---|---|---|---|
| 6,161,103 | A | 12/2000 | Rauer et al. |
| 6,904,428 | B2 | 6/2005 | Frieder et al. |
| 7,412,510 | B2 | 8/2008 | Schweitzer et al. |
| 7,620,665 | B1 | 11/2009 | George et al. |
| 7,631,065 | B2 | 12/2009 | Schweitzer et al. |
| 7,774,193 | B2 | 8/2010 | Gao et al. |
| 7,792,823 | B2 | 9/2010 | Cain et al. |
| 7,792,829 | B2 | 9/2010 | Brill et al. |
| 8,037,108 | B1 | 10/2011 | Chang |
| 8,055,661 | B2 | 11/2011 | Lee et al. |
| 8,255,789 | B2 | 8/2012 | Berger et al. |
| 8,364,673 | B2 | 1/2013 | Chang et al. |
| 8,442,988 | B2 | 5/2013 | Draese et al. |
| 8,719,014 | B2 | 5/2014 | Wagner |
| 8,781,989 | B2 | 7/2014 | Duchon |
| 8,910,018 | B2 | 12/2014 | Huang et al. |
| 9,262,397 | B2 | 2/2016 | Gamon et al. |
| 9,606,990 | B2 * | 3/2017 | Allen .................... G06F 17/289 |
| 2002/0078406 | A1 | 6/2002 | Kondoh et al. |
| 2003/0061030 | A1 | 3/2003 | Kuboyama et al. |
| 2003/0097384 | A1 | 5/2003 | Hu et al. |
| 2004/0030687 | A1 | 2/2004 | Hidaka |
| 2004/0103367 | A1 | 5/2004 | Riss et al. |
| 2004/0117739 | A1 * | 6/2004 | Challenger ....... G06F 17/30914 715/251 |
| 2006/0173834 | A1 | 8/2006 | Brill et al. |
| 2007/0011183 | A1 | 1/2007 | Langseth et al. |
| 2008/0027888 | A1 * | 1/2008 | Azzam ................ G06F 17/2785 706/45 |
| 2008/0208882 | A1 | 8/2008 | Zhang et al. |
| 2009/0171999 | A1 | 7/2009 | McColl et al. |
| 2009/0287678 | A1 | 11/2009 | Brown et al. |
| 2009/0313205 | A1 | 12/2009 | Hino et al. |
| 2010/0050074 | A1 | 2/2010 | Nachmani et al. |
| 2010/0146450 | A1 | 6/2010 | Harada |
| 2010/0280989 | A1 | 11/2010 | Mehra et al. |
| 2010/0281455 | A1 | 11/2010 | Anand et al. |
| 2011/0022550 | A1 | 1/2011 | Pennacchiotti et al. |
| 2011/0055172 | A1 | 3/2011 | Tan et al. |
| 2011/0060584 | A1 | 3/2011 | Ferrucci et al. |
| 2011/0066587 | A1 | 3/2011 | Ferrucci et al. |
| 2011/0125734 | A1 | 5/2011 | Duboue et al. |
| 2011/0126275 | A1 | 5/2011 | Anderson et al. |
| 2011/0161070 | A1 | 6/2011 | Chen et al. |
| 2011/0320419 | A1 | 12/2011 | Johnston et al. |
| 2012/0004905 | A1 | 1/2012 | Bobick et al. |
| 2012/0011115 | A1 | 1/2012 | Madhavan et al. |
| 2012/0191716 | A1 | 7/2012 | Omoigui |
| 2012/0251985 | A1 | 10/2012 | Steels et al. |
| 2012/0303661 | A1 | 11/2012 | Blohm et al. |
| 2013/0007055 | A1 | 1/2013 | Brown et al. |
| 2013/0018652 | A1 | 1/2013 | Ferrucci et al. |
| 2013/0060774 | A1 | 3/2013 | Shepherd et al. |
| 2013/0066886 | A1 | 3/2013 | Bagchi et al. |
| 2013/0290822 | A1 | 10/2013 | Chen |
| 2013/0325442 | A1 | 12/2013 | Dahlmeier et al. |
| 2014/0046696 | A1 | 2/2014 | Higgins et al. |
| 2014/0115012 | A1 | 4/2014 | Das |
| 2014/0122535 | A1 | 5/2014 | Scott et al. |
| 2014/0278358 | A1 | 9/2014 | Byron et al. |
| 2014/0325331 | A1 | 10/2014 | Madireddi |
| 2015/0066895 | A1 * | 3/2015 | Komissarchik ........ G06Q 50/01 707/709 |

FOREIGN PATENT DOCUMENTS

| | | |
|---|---|---|
| JP | 2011529594 A | 12/2011 |
| WO | WO 03/012661 A1 | 3/2003 |

OTHER PUBLICATIONS

"Apache PDFBox—A Java PDF Library", https://pdfbox.apache.org/, Accessed online Jun. 10, 2015. 2 pages.

"Gleaning Resource Descriptions from Dialects of Languages (GRDDL)", W3C Recommendation, W3C, http://www.w3.org/TR/grddl, Sep. 11, 2007, 17 pages.

"IBM SPSS Statistics", http://www-01.ibm.com/software/analytics/spss/products/statistics/, Accessed online Jun. 10, 2015, 2 pages.

"Microsoft Office", http://office.microsoft.com/en-us/, Accessed online Aug. 21, 2015, 5 pages.

"Natural Language Processing", Wikipedia, http://en.wikipedia.org/wiki/Natural_language_processing, Accessed online Jun. 10, 2015, 12 pages.

"ODFDOM—The Opendocument API", http://incubator.apache.org/odftoolkit/odfdom/index.html, Accessed online Jun. 10, 2015, 2 pages.

"Oracle Outside in Technology", http://www.oracle.com/us/technologies/embedded/025613.htm, Accessed online Jun. 10, 2015, 2 pages.

"SPARQLMotion Getting Started Guide", TopQuadrant, Inc., http://www.topquadrant.com/products/SPARQLMotion_docs/SPARQLMotion_guide.html, accessed on Oct. 25, 2012, 6 pages.

"SPSS Text Analytics for Surveys", http://www-01.ibm.com/software/analytics/spss/products/statistics/text-analytics-for-surveys/, Accessed online Jun. 10, 2015, 2 pages.

Bhagavatula, Chandra S., "Learning Semantics of WikiTables", Doctoral Thesis Proposal, Department of Electrical Engineering and Computer Science, Northwestern University, Dec. 9, 2013, 22 pages.

Golbeck, Jennifer et al., "New Tools for the Semantic Web", Knowledge Engineering and Knowledge Management: Ontologies and the Semantic Web, Lecture Notes in Computer Science, DOI: 10.1007/3-540-45810-7_ 35, vol. 2473/2002, 2002, 11 pages.

High, Rob, "The Era of Cognitive Systems: An Inside Look at IBM Watson and How it Works", IBM Corporation, http://ip.com/pdf/redbook/REDP495500.pdf, Dec. 12, 2012, 16 pages.

IBM, "Dynamic Model-Extracting Table Widget", IP.com, IPCOM000010243D, Nov. 11, 2002, 7 pages.

Langegger, Andreas et al., "XLWrap—Querying and Integrating Arbitrary Spreadsheets with SPARQL", Proceedings of the 8th international Semantic Web Conference, 2009, Springer-Verlag Berlin, Heidelberg, ISBN: 978-3-642-04929-3, 2009, 16 pages.

Li, Xiang et al., "Towards Fine-grained Citation Function Classification", Proceedings of Recent Advances in Natural Language Processing, Hissar, Bulgaria, Sep. 7-13, 2013, pp. 402-407.

Mccord, M.G. et al., "Deep parsing in Watson", IBM J. Res. & Dev. vol. 56 No. 3/4 Paper 3, May/Jul. 2012, pp. 3:1-3:15.

Oliver, Andrew C. et al., "Apache POI—the Java API for Microsoft Documents", Project News, http://poi.apache.org, May 11, 2015, 2 pages.

Pinto, David, "Table Extraction Using Conditional Random Fields", http://scholarworks.umass.edu/cs_faculty_pubs/76, 2003, Computer Science Department Faculty Publication Series, Paper 76, 9 pages.

Piris, Ruben N., "Extracting Knowledge Bases from Table-Structured Web Resources Applied to the Semantic Based Requirements Engineering Methodology SoftWiki", http://subs.emis.de/LNI/Proceedings/Proceedings176/1008.pdf, 2010, pp. 992-995.

Pivk, Aleksander et al., "From Tables to Frames", http://people.aifb.kit.edu/pci/FromTablesToFramesTech.pdf. Jul. 19, 2004, 1-17.

Syed, Zareen et al., "Exploiting a Web of Semantic Data for Interpreting Tables", Second Web Science Conference, Apr. 26-27, 2010, http://journal.webscience.org/322/2/websci10_submission_108.pdf, 8 pages.

Tao, Cui et al., "Automatic Hidden-Web Table Interpretation, Conceptualization, and Semantic Annotation", Department of Computer Science, Brigham Young University, Provo, UT 84602, USA, 2009, pp. 1-21.

Yuan, Michael J. et al., "Watson and Healthcare, How natural language processing and semantic search could revolutionize clinical decision support", IBM Corporation, developerWorks, http://www.ibm.com/developerworks/industry/library/ind-watson/, Apr. 12, 2011, pp. 1-14.

List of IBM Patents or Patent Applications Treated as Related, Aug. 26, 2015, 2 pages.

International Preliminary Report on Patentability dated Jun. 2, 2016 for International Application No. PCT/JP2014/005143, 8 pages.

(56) References Cited

OTHER PUBLICATIONS

Ishida, Kenji et al., "Answer narrowing-down technology in QA task using WWW (World Wide Web)", English Translation, Proceedings of the Eleventh Annual Meeting of the Association for Natural Language Processing, Mar. 15, 2005, 10 pages.

* cited by examiner

400

Lorem ipsum dolor sit amet, consectetur adipiscing elit. Donec mollis libero eget tempor varius. Donec tempus dolor enim, Id pelentesque sem feugiat et. Aenean elementum arcu a accumansan varius. Nulla vitae ante eleifend, aliquet nunc nec, malesuada elit. Vivamus bibendum dolor ex, iaculis vulputate nunc viverrra a. Sed vulputate molestie justo sit amet pulvinar. Proin ex mauris, dictum in lacus sed, maximus ultricies odio. Vestibulum eget efficitur tortor. Curabitur ultrics nulla ultricies nibh euismod, nec convallis justo malesuada. Class aptent taciti sociosqu ad litora torquent per conubia nostra, per inceptos himenaeos. Praesent vitae risus nulla. Donec blandit dolor sem, eu rhoncus arcu porta a. Cum sociis natoque penatibus et magnis dis parturient montes, nascetur ridiculus mus. Praesent aligquet ornare nibh, eget accumsan sem fringilla non.

| Column 1 | Column 2 | Column 3 | Column 4 | Column 5 |
|---|---|---|---|---|
| 1-A | 2-A | 3-A | 4-A | 5-A |
| 1-B | 2-B | 3-B | 4-B | 5-B |
| 1-C | 2-C | XYZ | 4-C | 5-C |
| 1-D | 2-D | 3-D | 4-D | 5-D |
| 1-E | 2-E | 3-E | 4-E | 5-E |
| 1-F | 2-F | 3-F | 4-F | 5-F |

Table 1: Dolors

410

Sed ut ex eu tellus rutrum dapibus. Vivamus volutpat volutpat libero, ut psuere arcu semper non. Nam luctus commodo maximus. Maecenas a feugiat purus. Suspendisse blandit diam vel viverra dapibus. Sed justo erat, fringilla at imperdiet ac, molestie et nisl. Donec eu ex ut elit facilisis pellentiesque. Sed vitae finibus metus, sed dignissim nulla. Nunc at odio tristique purus scelerisque consectetur at nec tellus. Nam interdum nulla mi, sit amet vestibulum nibh dapibus sit amet. Aliquam sit amet odio feugiat, venenatis massa non, placerat nibh. Ut lacinia volutpat porta. Sed maximus bibendum fringilla. Nunc ultrices metus eu volutpat rhoncus aliquam sit amet odio, as in Column 3, row 3.

SELECTIVE FACT GENERATION FROM TABLE DATA IN A COGNITIVE SYSTEM

BACKGROUND

The present application relates generally to an improved data processing apparatus and method and more specifically to mechanisms for selective fact generation from table data structures in electronic documents ingested by a cognitive system.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

Examples, of QA systems are Siri® from Apple®, Cortana® from Microsoft®, and question answering pipeline of the IBM Watson™ cognitive system available from International Business Machines (IBM®) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising a processor and a memory having instructions which, when executed by the processor, cause the processor to implement an ingestion engine for ingesting natural language textual content. The method comprises initiating, by the ingestion engine, ingestion of natural language textual content and identifying, by the ingestion engine, an embedded structured data portion within the natural language textual content. The method further comprises generating, by the ingestion engine, a signature of the structured data portion. The signature comprises one or more metadata elements describing the configuration or content of the structured data portion. Moreover, the method comprises identifying, by the ingestion engine, references to the structured data portion in natural language text portions of the natural language textual content and evaluating, by the ingestion engine, the references based on the signature of the structured data portion. Furthermore, the method comprises generating, by the ingestion engine, an ingestion prioritization plan for ingesting a set of facts associated with a set of elements of the structured data portion based on results of the evaluation. In addition, the method comprises applying, by the ingestion engine, the ingestion prioritization plan to generate the set of facts and store the set of facts in an ingested representation of the natural language textual content.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 is an example diagram of an electronic document having an embedded structured data portion, illustrated as a table, with which the illustrative embodiments may be implemented.

DETAILED DESCRIPTION

Figure 1:
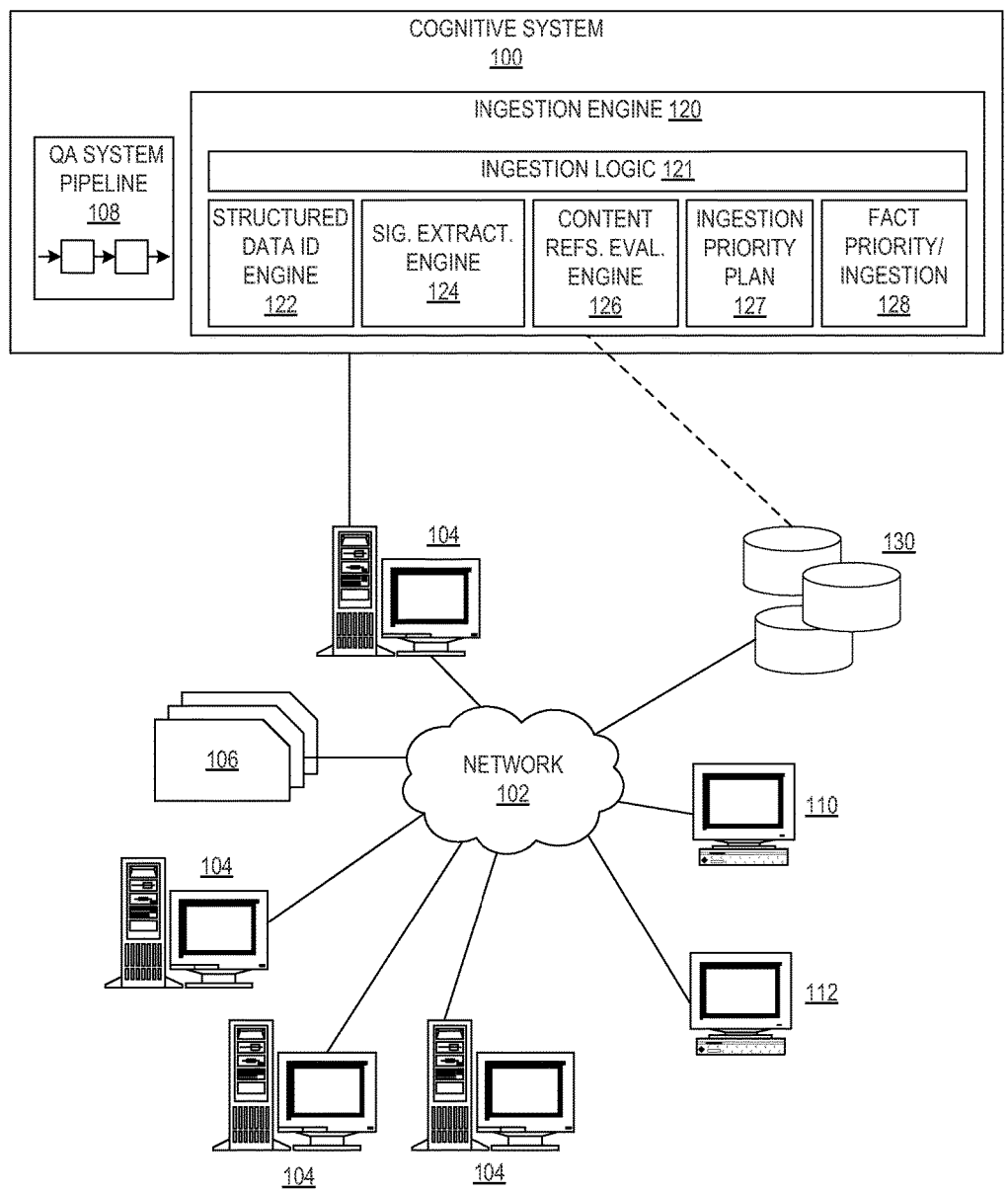
FIG. 1 depicts a schematic diagram of one illustrative embodiment of a question/answer creation (QA) system in a computer network.

In a cognitive system, such as a Question and Answer (QA) system or other unstructured information system that operates on natural language content, the information sources are a critical component to obtaining reliable results from the operation of the cognitive system. For many domains, such as science domains, medical domain, financial domain, and other technical, scientific, business, and the like domains, documents often include complex structured data portions, e.g., tables of information with important content, embedded in the unstructured document, e.g., medical journal papers with embedded tables indicating medical trial results. These structured data portions, such as lists, tables, spreadsheets, and the like, may contain many columns and/or rows, and possibly multiple sheets of tables, which map to countless numbers of inferences. Thus, there arises a problem with the quality, quantity, and importance of the inferences extracted from complex structured data portions, e.g., tables, when ingesting these unstructured natural language documents for use by the cognitive systems.

For example, in the document shown in FIG. 4, there is only one reference 420 to a single cell of the embedded table 410 in the textual content of the document 400. If the table 410 is processed independently of the document, there could potentially be hundreds of facts generated. However, looking at the references in the document, only one fact is important to the understanding of the concepts espoused in the document text, as indicated by the single reference 420 in the natural language text of the document. Thus, the independent processing of the table 410 during ingestion of the document 400 poses a large waste of processing resources since much of the processing performed is of little use in understanding the concepts present in the document. Therefore, it would be beneficial to have an optimized ingestion process for focusing fact generation on the facts in table structures that are referenced by the surrounding natural language content and thus, present supportive information content for the concepts being described in the natural language content of the document.

The illustrative embodiments provide mechanisms for performing selective fact generation from structured data portions of an unstructured natural language document. For purposes of the following description it will be assumed as an example that the structured data portion is a table data structure and that the unstructured natural language document is an electronic document that is provided as part of a corpus of information. Thus, in some illustrative embodiments, mechanisms are provided for performing selective fact generation from table data structures in electronic documents, such as part of an ingestion process for a cognitive system. The mechanisms of these illustrative embodiments, when ingesting electronic documents of a corpus upon which a cognitive system operates, identify table data structures (or other embedded structured data structures) in the electronic documents (hereafter referred to simply as "table data" associated with "documents") and extract table signature information that identifies the configuration of the structure and content of the table data. The extracted table signature information is used to resolve references to the table data in natural language content of the document or other documents in the same or different corpora. That is, references to the table data are extracted from the natural language content and are evaluated in reference to the extracted table signature information to determine which portions of the table data are referenced by the natural language content and patterns of reference to the table data, e.g., frequency of reference to each referenced portion of the table data.

A prioritization plan for the ingestion of facts from table data of the electronic document. Various ways of weighting the facts that are ingestible from the table data may be utilized by the mechanisms of the illustrative embodiments, examples of which will be discussed in greater detail hereafter. Based on the prioritization plan, various facts are ingested from the table data. Ingestion limits may be established so as to limit the amount of the table data facts that are ingested to focus the ingestion on only those facts that are most relevant to the concepts described in the natural language content of the document and/or other documents referencing the table data.

For example, consider a scenario in which a system administrator, automated process, or the like, selects a corpus of documents to be ingested into a QA system for use in answering input natural language questions. The ingestion process of the QA system selects a document, such as that shown in FIG. 4, which includes an embedded table data structure. With the mechanisms of the illustrative embodiments, as described in greater detail hereafter, the ingestion process detects the presence of the table data structure 410 in the document 400 and invokes operations to extract the signature information for the table data structure 410. The table's signature comprises such information as the table name, row and column headers of the table 410, sheet names, formulas and cell contents, and any other information descriptive of the configuration of the table data structure. The extracted signature information is used as a basis for evaluating references to the table data structure 410 in the natural language content of the document and/or other documents in the same or different corpora. In one illustrative embodiment, the number of references to the particular elements of the extracted signature of the table data structure is determined and used as a basis for generating a prioritized set of fact generation operations for the various portions of the extracted signature, e.g., generate a column 3 fact, generate a row 3 fact, etc.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
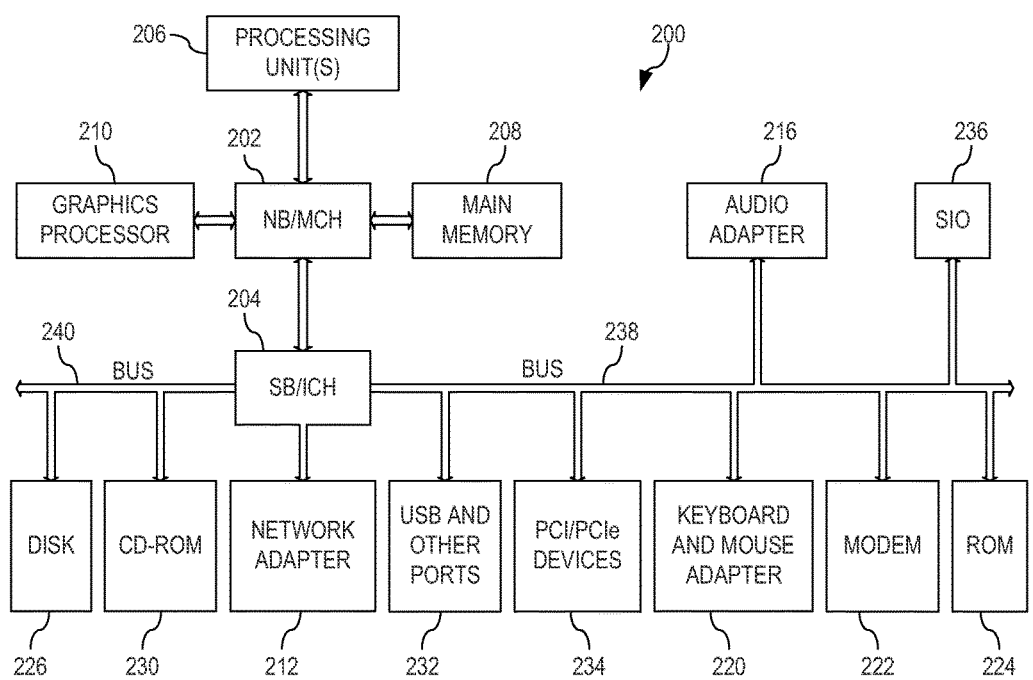
FIG. 2 is a block diagram of an example data processing system in which aspects of the illustrative embodiments are implemented.
Figure 3:
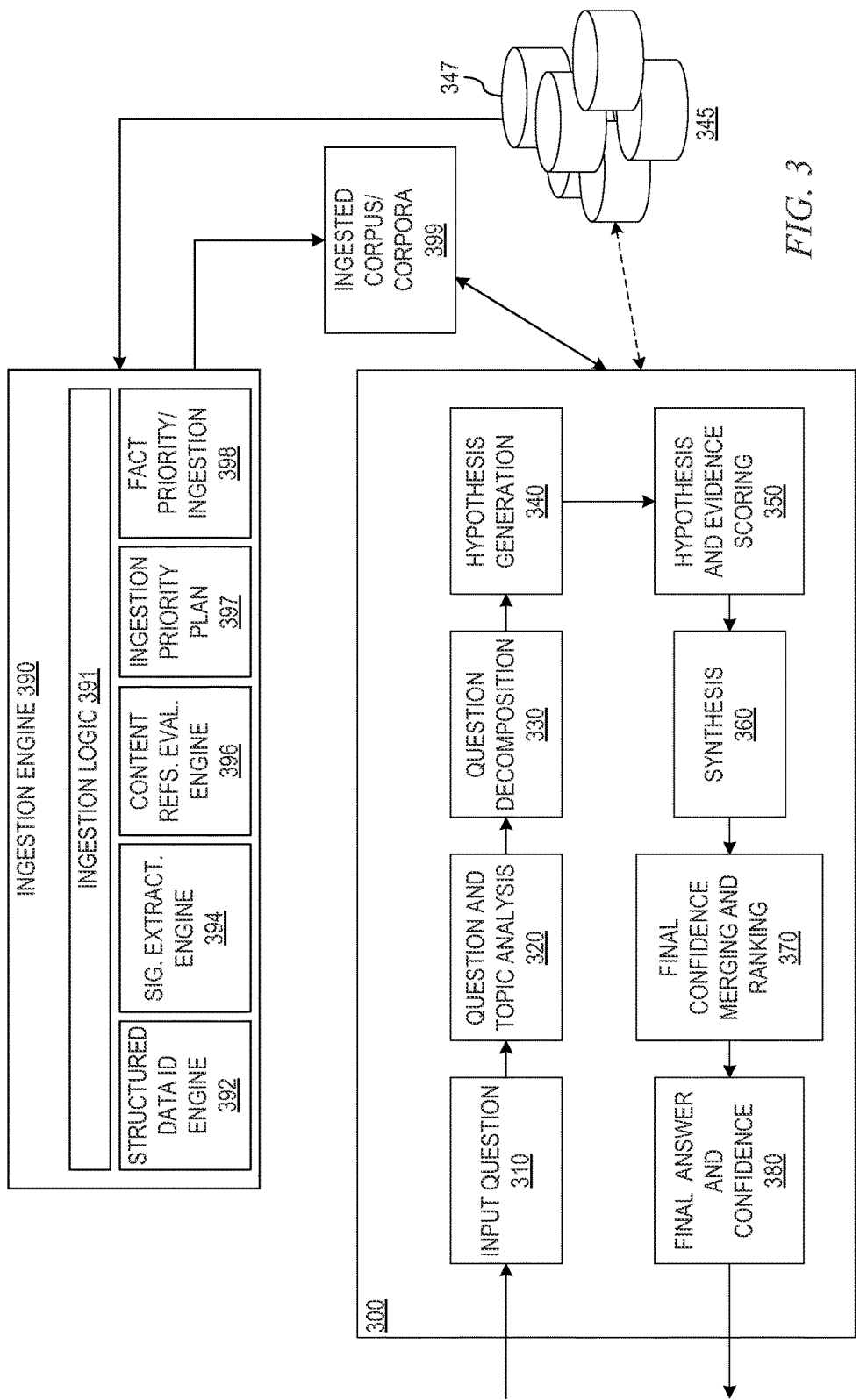
FIG. 3 illustrates a QA system pipeline for processing an input question in accordance with one illustrative embodiment.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example cognitive system implementing a Question Answer (QA) pipeline (also referred to as a Question/Answer pipeline or Question and Answer pipeline), methodology, and computer program product with which the mechanisms of the illustrative embodiments are implemented. As will be discussed in greater detail hereafter, the illustrative embodiments are integrated in, augment, and extend the functionality of these QA mechanisms of the cognitive system with regard to ingestion of facts from embedded structured content of unstructured natural language documents. That is, the illustrative embodiments extend the functionality of the QA mechanisms, or other cognitive system mechanisms in other implementations, with regard to identifying structure portions of content in unstructured content, identification of the signatures of such unstructured content, and utilizing a comparison of the signatures with references to the elements of the signatures in the surrounding unstructured content, or unstructured content in other corpora, to determine a prioritized set of facts to be ingested and then ingesting those facts in accordance with the prioritization and various configuration parameters.

Thus, as one example embodiment involves the implementation of the mechanisms of the illustrative embodiments with a cognitive system incorporating a QA system pipeline, it is important to first have an understanding of how question and answer creation in a cognitive system implementing a QA pipeline is implemented before describing how the mechanisms of the illustrative embodiments are integrated in and augment such QA mechanisms. It should be appreciated that the QA mechanisms described in FIGS. 1-3 are only examples and are not intended to state or imply any limitation with regard to the type of QA mechanisms with which the illustrative embodiments are implemented. Many modifications to the example cognitive system shown in FIGS. 1-3 may be implemented in various embodiments of the present invention without departing from the spirit and scope of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process as well as enable people and machines to interact in a more natural manner so as to extend and magnify human expertise and cognition. A cognitive system comprises artificial intelligence logic, such as natural language processing (NLP) based logic, for example, and machine learning logic, which may be provided as specialized hardware, software executed on hardware, or any combination of specialized hardware and software executed on hardware. The logic of the cognitive system implements the cognitive operation(s), examples of which include, but are not limited to, question answering, identification of related concepts within different portions of content in a corpus, intelligent search algorithms, such as Internet web page searches, for example, medical diagnostic and treatment recommendations, and other types of recommendation generation, e.g., items of interest to a particular user, potential new contact recommendations, or the like.

IBM Watson™ is an example of one such cognitive system which can process human readable language and identify inferences between text passages with human-like high accuracy at speeds far faster than human beings and on a larger scale. In general, such cognitive systems are able to perform the following functions:

Navigate the complexities of human language and understanding

Ingest and process vast amounts of structured and unstructured data

Generate and evaluate hypothesis

Weigh and evaluate responses that are based only on relevant evidence

Provide situation-specific advice, insights, and guidance

Improve knowledge and learn with each iteration and interaction through machine learning processes Enable decision making at the point of impact (contextual guidance)

Scale in proportion to the task

Extend and magnify human expertise and cognition

Identify resonating, human-like attributes and traits from natural language

Deduce various language specific or agnostic attributes from natural language

High degree of relevant recollection from data points (images, text, voice) (memorization and recall)

Predict and sense with situational awareness that mimic human cognition based on experiences Answer questions based on natural language and specific evidence In one aspect, cognitive systems provide mechanisms for answering questions posed to these cognitive systems using a Question Answering pipeline or system (QA system). The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to cognitive system which implements the QA pipeline. The QA pipeline then answers the input questions using the content in the corpus of data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question which is then interpreted by the QA pipeline and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA pipeline receives an input question, parses the question to extract the major features of the question, uses the extracted features to formulate queries, and then applies those queries to the corpus of data. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e. candidate answer, is inferred by the question. This process is repeated for each of the candidate answers until the QA pipeline identifies candidate answers that surface as being significantly stronger than others and thus, generates a final answer, or ranked set of answers, for the input question.

As mentioned above, QA pipeline and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA pipeline to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA pipeline. Content creators, automated tools, or the like, annotate or otherwise generate metadata for providing information useable by the QA pipeline to identify these question and answer attributes of the content.

Operating on such content, the QA pipeline generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a cognitive system 100 implementing a question answering (QA) pipeline 108 in a computer network 102. One example of a question/answer generation operation which may be used in conjunction with the principles described herein is described in U.S. Patent Application Publication No. 2011/0125734, which is herein incorporated by reference in its entirety. The cognitive system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The cognitive system 100 and network 102 enables question/answer (QA) generation functionality for one or more cognitive system users via their respective computing devices 110-112. Other embodiments of the cognitive system 100 may be used with components, systems, subsystems, and/or devices other than those that are depicted herein.

The cognitive system 100 is configured to implement a QA pipeline 108 that receive inputs from various sources. For example, the cognitive system 100 receives input from the network 102, a corpus of electronic documents 106, cognitive system users, and/or other data and other possible sources of input. In one embodiment, some or all of the inputs to the cognitive system 100 are routed through the network 102. The various computing devices 104 on the network 102 include access points for content creators and QA system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

In one embodiment, the content creator creates content in a document of the corpus of data 106 for use as part of a corpus of data with the cognitive system 100. The document includes any file, text, article, or source of data for use in the cognitive system 100. QA system users access the cognitive system 100 via a network connection or an Internet connection to the network 102, and input questions to the cognitive system 100 that are answered by the content in the corpus of data 106. In one embodiment, the questions are formed using natural language. The cognitive system 100 parses and interprets the question via a QA pipeline 108, and provides a response to the cognitive system user, e.g., cognitive system user 110, containing one or more answers to the question. In some embodiments, the cognitive system 100 provides a response to users in a ranked list of candidate answers while in other illustrative embodiments, the cognitive system 100 provides a single final answer or a combination of a final answer and ranked listing of other candidate answers.

The cognitive system 100 implements the QA pipeline 108 which comprises a plurality of stages for processing an input question and the corpus of data 106. The QA pipeline 108 generates answers for the input question based on the processing of the input question and the corpus of data 106. The QA pipeline 108 will be described in greater detail hereafter with regard to FIG. 3.

In some illustrative embodiments, the cognitive system 100 may be the IBM Watson™ cognitive system available from International Business Machines Corporation of Armonk, N.Y., which is augmented with the mechanisms of the illustrative embodiments described hereafter. As outlined previously, a QA pipeline of the IBM Watson™ cognitive system receives an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The QA pipeline of the IBM Watson™ cognitive system then performs deep analysis on the language of the input question and the language used in each of the portions of the corpus of data found during the application of the queries using a variety of reasoning algorithms. The scores obtained from the various reasoning algorithms are then weighted against a statistical model that summarizes a level of confidence that the QA pipeline of the IBM Watson™ cognitive system has regarding the evidence that the potential response, i.e. candidate answer, is inferred by the question. This process is be repeated for each of the candidate answers to generate ranked listing of candidate answers which may then be presented to the user that submitted the input question, or from which a final answer is selected and presented to the user. More information about the QA pipeline of the IBM Watson™ cognitive system may be obtained, for example, from the IBM Corporation website, IBM Redbooks, and the like. For example, information about the QA pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As shown in FIG. 1, the cognitive system 100 is further augmented, in accordance with the mechanisms of the illustrative embodiments, to include logic implemented in specialized hardware, software executed on hardware, or any combination of specialized hardware and software executed on hardware, for implementing an ingestion engine 120. The ingestion engine 120 comprises, in accordance with the illustrative embodiments, along with other ingestion logic 121 that controls the overall ingestion operation and performs general ingestion operations for loading documents and performing initial processing of the loaded documents, a structured data portion identification engine 122, a structured data portion signature extraction engine 124, an unstructured content references identification and evaluation engine 126, and a structured data portion fact prioritization and ingestion engine 128.

In operation, the ingestion engine 120 receives a command or request to ingest a corpus of information 130 which comprises one or more portions of natural language content, which are assumed for purposes of this description to be documents. The process of the ingestion engine 120 described hereafter may be performed iterative for each document that is ingested by the ingestion engine 120. However, for ease of explanation, the present description will focus on a single document ingestion.

In response to the command/request, the ingestion logic 121 loads the document and the provenance information for the document. For example, the document may be loaded via Apache POI, Unstructured Information Management Architecture (UIMA), Apache Open Document Format Document Object Model (ODFDOM), Optical Character Reading (OCR), Object Linking and Embedding (OLE), or other known methods to load the document in an in-memory representation. The provenance information may include such information as a link to the source of the document, e.g., a Uniform Resource Locator (URL), the title of the document, authors of the document, publication information, and the like.

The loaded document is then parsed and analyzed by the structured data portion identification engine 122 to look for any structured data identifiers in the loaded document. For example, again assuming an illustrative embodiment in which the structure data structures are tables embedded into natural language documents, the loaded document data is parsed and analyzed by the structured data portion identification engine 122 to locate any table markers in the document data. Thus, assuming that the loaded document is provided as a HyperText Markup Language (HTML) based document, the tag <TABLE> or other formatted tag which is used to designate a table structure may be looked for in the document data. HTML documents may also identify div/span which represents tables from the html css class. In a first pass of the analysis, nested tables may be ignored but may be processed in subsequent passes in an iterative manner. The particular table markers are implementation dependent based on the particular formats of the documents being ingested. Thus, for example, in the Office Productivity Format, documents may have the <TABLE> attribute in an OOXML format. OOXML may be embedded in the XML format or in separate OLE tables. Other types of table markers for Portable Document Format (PDF), image based formats (e.g., common spacing and headers, breaks in structured columns, border characteristics, etc.), and the like may likewise be identified by the ingestion logic 121. Moreover, the ingestion logic 121 may look for and identify a "Table Reference" section of the document and identify any links or pointers to the tables within the document to thereby identify the document as having tables and identifying the location of the tables so that corresponding table signature information may be extracted.

Assuming that the structured data portion identification engine 122 identifies a structured portion of data, e.g., a table, in the unstructured natural language document data that has been loaded, the signature extraction engine 124 is invoked to extract signature information for the identified structured portion of data. Again, assuming a table to be the structured portion of data, the signature extraction engine 124 extracts metadata from the table such as the title of the table, headers from the columns and rows, as well as cell information, pivots, and the like. This metadata may be stored into a lookup table and may have an associated priority score associated with each element of the metadata. The priority score indicates the priority or importance of the facts indicated by the corresponding element and is used by the illustrative embodiments to rank the facts for ingestion as described hereafter.

Initial priority scores may be established based on an initial assessment of the metadata elements performed by the signature extraction engine 124. This initial assessment may, for example, look at the formatting of the corresponding metadata element, e.g., highlighting, bolding, italic text, or other characteristics and indications of relative greater importance or preference of particular elements of the table, to determine an initial score for the corresponding metadata element. Metadata elements that do not have any particular characteristics or indications of greater importance or preference may be assigned a default initial priority score, e.g., zero. Priority scores are indicative of the importance of the corresponding metadata elements.

In addition to evaluating the initial scoring for metadata elements based on the characteristics and indications of relative importance, such as in the formatting of the table, the signature extraction engine 124 may further utilize natural language processing techniques within the context of the document as a whole to infer relative levels of importance of elements of the table or the table as a whole. For example, looking at the document as a whole, if the table is present within a section of the document entitled "Prior Art" or "Related Background" or the like, as opposed to a section identified as "Experiments", "Findings", "Results", or the like, then the table's metadata element scores may be set to a relatively lower priority score than a table that is in one of the latter sections of the document. Moreover, additional clues to the importance of the tables themselves may be found in the sentences of the natural language text surrounding the table and may be identified through natural language processing of the text, e.g., a statement such as "our findings are shown in table X" indicates that the table X is of particular importance since it shows the findings of the experiment and thus, the priority scores of the metadata elements extracted as part of the signature for table X will be given a relatively higher score than perhaps other tables within the same document that illustrate background or prior art information.

Having identified the structured data portions of the loaded document and extracted a signature for the structure data portion comprising metadata elements that indicate the configuration of the structured data portion as well as an initial assessment of the relative priorities of the various metadata elements, the unstructured content references identification and evaluation engine 126 parses and analyzes the natural language text content surrounding the identified structure data portions to identify references from the natural language text to content in the structured data portions or to the structure data portions as a whole. The amount of natural language text and its location relative to the structured data portions, that is processed by the unstructured content references identification and evaluation engine 126 to identify references to the structured data portion (e.g., table) may be different depending upon the particular implementation desired. For example, in one illustrative embodiment, again assuming the structured data portion to be a table, the unstructured content references identification and evaluation engine 126 may parse and analyze the text of the page of the document on which the table is present, a predetermined number of paragraphs prior to and after the table within the document, a section of the document in which the table is present, the entire document, or even other documents in the same or a different corpus.

For each reference to a metadata element of the table found in the portions of natural language text analyzed, the corresponding priority score for the metadata element is increased, e.g., incremented by one. For references to specific cells within the table, partially assigned priority score increases may be utilized based on cell usage. For example, if there is a reference in the natural language text to cell A3, then there is an implied importance to row 3 and column A. Therefore, a weight to the priority score may be given to column A of 0.5, a weight to the priority score of all of row 3 of 0.5, and a weight to cell A3 of 1.0, for example. The references that are identified may be references to specific rows, columns, or cells by structural reference (e.g., row number, column number, cell index, or the like) or by correspondence between textual references in the analyzed natural language text and textual content of the metadata elements, e.g., a reference to the "Customer" column in the analyzed natural language text may be mapped to a "Customer" column header of a column metadata element and a corresponding priority score associated with the Customer column may be increased accordingly.

The correlation of references in the natural language text to metadata elements of tables in the document may be complicated when the document comprises multiple tables, possibly in close proximity to one another in the document, e.g., in the same section of the document. In such cases, when multiple tables or structured data portions exist in the document, and there are only passive references to tables in general, e.g., "cell A3", the passive references are associated with the table most closely aligned to the section/passage structure.

It should be appreciated that the increase in the priority scores for the identified references to the metadata elements of the table may be weighted according to various characteristics of the reference identified by the unstructured content references identification and evaluation engine 126. For example, the increase in priority score for a particular metadata element A1 may be more heavily weighted (higher increase in priority score) in response to there being multiple references to the metadata element A1 in the analyzed natural language text portions, and may be relatively more heavily weighted with greater numbers of references to the same metadata element A1. As another example, if there are multiple references to the table as a whole in the analyzed natural language text, then the priority scores associated with the metadata elements of the particular table are weighted more heavily. In yet another example, if a combination of references to metadata elements in the table appear multiple times in the analyzed natural language text, then the corresponding metadata elements have their priority scores weighted more heavily.

In some illustrative embodiments, the weight given to the priority score for a reference to an entire column or an entire row may be half that, or other fractional portion, of the weight assigned to a specific reference to a particular cell within the table, e.g., the priority score increase for a reference to a particular cell may be 1 while the priority score increase for a reference to an entire column may be 0.50. In still other illustrative embodiments, a sole column or row reference may be weighted at a different level than a sole cell reference such that cell/row/column/sheet/workbook references may be weighted independently.

In still further illustrative embodiments, the weight given to the priority scores for metadata elements may be modified in accordance with a determined interdependency of the metadata elements with other metadata elements of the structured data portion (e.g., table). For example, the weighting mechanisms of the unstructured content references identification and evaluation engine 126 may be configured to take into account cross document references when calculating the priority scores of the metadata elements of the various documents. For example, if document A refers to document B, table 1, row 1, then the priority score for ingesting facts from table 1, row 1 of document B may be increased.

In another illustrative embodiment, the weighting mechanisms may evaluate any formulas present in association with the metadata elements of the structured data portion and apply appropriate weightings to the metadata elements that are part of the formulas. For example, if values in column X are the result of a formula involving values from columns Y and Z, and column X has a relatively high priority score, then columns Y and Z may have their priority scores similarly weighted more heavily.

In still another illustrative embodiment, the weighting mechanisms may apply a gradient to the priority scores associated with the metadata elements. For example, if a first column is assigned a relatively high priority score, second column(s) next to, or in close proximity to, or which have a formulaic relationship with the values in the first column, are assigned a high priority score, but one that is slightly less than the priority score of the first column. Similarly, columns in close proximity to, or which have a formulaic relationship with the values in the second column(s) may have their priority scores weighted slightly less than the second column(s), and so on, such that a gradient of priority score weightings is achieved.

The weighting mechanisms of the unstructured content references identification and evaluation engine 126 may further analyze any revision or track changes indicators, release notes, or any other indication of changes that have been made to the structured data portion which are associated with the document as indicators of weights to be applied to priority scores. That is, for example, newer elements of the structured data portion, as indicated by the revisions/changes information may be given higher weighting than older elements in the structured data portion.

In yet another illustrative embodiment, the unstructured content references identification and evaluation engine 126 may look to author/publisher, or other source, profiles to perform a lookup operation of the author, publisher, or source of the document in which the structured data portion is present, or to which the structured data portion is attributed (e.g., a document may include an acknowledgement of a source of a table or other structured data portion which can be used as a basis for this lookup operation), so as to determine a relative reliability or reputation of the author, publisher, or source. Appropriate weighting may be applied to the priority scores of the structured data portion metadata elements based on an evaluation of the reliability or reputation of the author, publisher, or source such that more reliable authors, publishers, or sources are given higher weightings than less reliable ones.

As noted above, in some illustrative embodiments, the weighting of the priority scores of metadata elements of a structured data portion is based on the frequency of occurrence of references to the metadata elements in the unstructured natural language text portions of the document, or other documents. Such embodiments imply that more frequently referenced metadata elements are relatively more important or indicative of concepts being conveyed by the document(s) than less frequently referenced metadata elements and thus, facts generated based on these metadata elements should be given greater priority when ingesting the structured data portion of the document. In still other illustrative embodiments the weighted priority scores for metadata elements may be inverted so as to generate a type of inverse document frequency (IDF) measure of the metadata elements. In such embodiments, what is important is the uniqueness of metadata elements such that metadata elements that are not referenced by the unstructured natural language text of the document or other documents are considered more unique than those that are referenced. Such embodiments take into consideration that the most frequently reference portions of a structured data portion, e.g., table, are most likely directed to facts that are otherwise identified in the natural language text whereas portions of the structured data portion that are not as frequently referenced in the natural language text are less likely to have similar facts generated from the natural language text and thus, the structured data portion may be the only source of those facts.

It should also be appreciated that the weighting mechanisms of the unstructured content references identification and evaluation engine 126 may, in a similar fashion as the initial priority scores are generated, take into consideration the formatting of the metadata elements within the structured data portion so as to increase the weight on priority scores for metadata elements that have different formatting than other elements of the structured data portion. Thus, for example, if a particular column header, row header, text in a cell, or the like, is bolded, highlighted, italicized, or the like, then that particular metadata element may have its corresponding priority score weighted more heavily than others.

The various bases for determining the weightings to be applied to the priority scores are referred to herein as the weighting characteristics and the weights themselves are weighting factors applied to the priority score or contribution to the priority score. That is, it should be appreciated that when the above description mentions the "weighting" of priority scores, what is meant is that the increase of the priority score is weighted in the particular manner described or that a weighting factor is applied to the already existing priority score. Thus, for example, if the number of references to a particular metadata elements is "2", this increase to the metadata element's priority score, in an unweighted manner, may increase the priority score by 2, e.g., 0.5+2=2.5. However, with the weighting mechanisms of the illustrative embodiments, a weight value may be applied as determined by the particular weighting characteristics evaluated using one or more of the illustrative embodiments described above, to modify the addition to the priority score, e.g., 0.5+2*0.8=1.65, where 0.8 is the weighting factor applied based on the evaluation of the weighting characteristics.

The calculated priority scores for the various metadata elements extracted from the structured data portion of the document are stored as an ingestion prioritization plan 127 and provided to the structured data portion fact prioritization and ingestion engine 128. The ingestion prioritization plan 127 essentially ranks the various metadata elements according to priority score so as to indicate which metadata elements are more important to load into memory relative to other metadata elements. The structured data portion fact prioritization and ingestion engine 128 may apply one or more thresholds, ingestion limits, or other criteria to select metadata elements from the ingestion prioritization plan 127 based on their associated priority scores, for ingestion (e.g., loading into memory as an in-memory data structure) by the cognitive system 100. For example, the structured data portion fact prioritization and ingestion engine 128 may select only those metadata elements whose priority score is equal to or greater than a particular threshold value. As another example, the structured data portion fact prioritization and ingestion engine 128 may select only the top 10 ranked metadata elements. In still another example, a combination of a particular number of top ranked metadata elements and those that have at least a predetermined threshold priority score may be utilized. Any selection criteria suitable to the particular implementation may be utilized without departing from the spirit and scope of the illustrative embodiments.

In general, the structured data portion fact prioritization and ingestion engine 128 applies the selection criteria to the ranked metadata elements in the ingestion prioritization plan 127 to select a set of metadata elements to be ingested and the order in which the ingestion is to take place. The set of metadata elements may be a subset of the metadata elements identified through the extraction process described above. Thus, not all of the metadata elements will be the subject of ingestion.

For those metadata elements in the set of metadata elements selected by the structured data portion fact prioritization and ingestion engine 128 for ingestion, facts are generated by the structured data portion fact prioritization and ingestion engine 128 based on the content of the corresponding elements in the structured data portion. Thus, for example, if a column of a table is selected for ingestion, then corresponding facts for the elements within that column are generated and ingested into an in-memory data structure representing the table. The ingested facts are associated with the ingested document for use by the cognitive system 100 in performing its cognitive operations, e.g., answering natural language questions input to the QA system pipeline 108 by looking for the answers in the content of ingested documents.

For example, consider a natural language text and corresponding embedded table as follows:

| Galaxies Table - Distance to Nearest Galaxies | | |
|---|---|---|
| | Galaxy (A) | Distance (B) (In Megaparsecs) |
| 1 | Andromeda II | 2.130 |
| 2 | Milky Way | 0.027 |
| 3 | NGC 2403 | 10.76 |

"The Milky Way (A2) is our galaxy. The next closest is *Andromeda* II (A1) which is still millions of miles away, approximately 2.130 megaparsecs. You can see precise measurements in the above Galaxies table."

In this example, the facts that may be generated based on the references in the text to the metadata elements of the signature for the table, and the various relationships of the metadata elements within the table, may be of the type:

(1) Given *Andromeda* II, *Andromeda* II is a distance of 2.130 megaparsecs;

(2) Given Milky Way, Milky Way is a distance of 0.027 megaparsecs;

(3) Given Milky Way, *Andromeda* are galaxy;

(4) Given 2.130 megaparsecs, 0.027 megaparsecs are distances.

Note that since NGC 2403 was not referenced in the natural language text, its priority score remains 0 and no ingestion of facts with regard to NGC 2403 is performed.

Thus, the illustrative embodiments provide a mechanism for prioritizing the ingestion of portions of an embedded structured data portion in an unstructured natural language textual content, e.g., document. The illustrative embodiments analyze the embedded structured data portion to extract a signature of the embedded structured data portion which comprises one or more metadata elements describing the configuration and/or content of the structured data portion. The metadata elements are used as a basis to identify references to the structured data portion in the unstructured natural language text and calculate priority scores for the metadata elements. The priority scores for the metadata elements are combined into an ingestion prioritization plan which is then used as a basis for selecting a set of metadata elements for prioritized ingestion when ingesting the unstructured natural language textual content. In this way, a subset of the content of the embedded structured data portion may be ingested in accordance with the priorities set forth in the ingestion prioritization plan which reflects the importance of the subset of content relative to other content of the embedded structured data portion due to references to the subset of content in the unstructured natural language text. This prioritized ingestion performed by the mechanisms of the illustrative embodiments is of considerable importance when one considers that typically thousands or even millions of documents are being ingested. The mechanisms of the illustrative embodiments permit the ingestion engine of the cognitive system to spend time and resources on the portions of the documents that are most likely the most useful portions for performing cognitive operations.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which, which implements a cognitive system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline, of a cognitive system, for processing an input question in accordance with one illustrative embodiment. The QA system pipeline of FIG. 3 may be implemented, for example, as QA pipeline 108 of cognitive system 100 in FIG. 1. It should be appreciated that the stages of the QA pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA pipeline 300 comprises a plurality of stages 310-380 through which the cognitive system operates to analyze an input question and generate a final response. In an initial question input stage 310, the QA pipeline 300 receives an input question that is presented in a natural language format. That is, a user inputs, via a user interface, an input question for which the user wishes to obtain an answer, e.g., "Who are Washington's closest advisors?" In response to receiving the input question, the next stage of the QA pipeline 300, i.e. the question and topic analysis stage 320, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 3, the identified major features are then used during the question decomposition stage 330 to decompose the question into one or more queries that are applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries are applied to one or more databases storing information about the electronic texts, documents, articles, websites, and the like, that make up the corpus of data/information, e.g., the corpus of data 106 in FIG. 1. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA pipeline 300, in stage 350, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexity may be used to generate scores for candidate answers and evidence without departing from the spirit and scope of the present invention.

In the synthesis stage 360, the large number of scores generated by the various reasoning algorithms are synthesized into confidence scores or confidence measures for the various hypotheses. This process involves applying weights to the various scores, where the weights have been determined through training of the statistical model employed by the QA pipeline 300 and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA pipeline 300 that identifies a manner by which these scores may be combined to generate a confidence score or measure for the individual hypotheses or candidate answers. This confidence score or measure summarizes the level of confidence that the QA pipeline 300 has about the evidence that the candidate answer is inferred by the input question, i.e. that the candidate answer is the correct answer for the input question.

The resulting confidence scores or measures are processed by a final confidence merging and ranking stage 370 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question via a graphical user interface or other mechanism for outputting information.

As shown in FIG. 3, in accordance with one illustrative embodiment, the QA system pipeline 300 performs its operations with regard to an ingested representation 399 of a corpus 345 or corpora 347, which may be comprised of one or more in-memory data structures that represent the structure and content of the documents present in the ingested corpus 345 or corpora 347. As part of the generation of the ingested corpus/corpora 399, the mechanisms of the illustrative embodiments are employed to perform ingestion using the ingestion engine 390 having elements 391-398 which operate in the manner previously described above with regard to similar elements 121-128 of ingestion engine 120 in FIG. 1. As shown in FIG. 3, when the above operations for generating candidate answers and scoring these candidate answers in the QA system pipeline 300 are described as being performed with regard to the corpus 345 or corpora 347, it should be appreciated that these operations may in fact be done with regard to an in-memory ingested corpus/corpora 399 representation of the documents and textual content. It should further be appreciated that as part of this ingested corpus/corpora 399 representation, sets of the metadata elements of embedded structured data portions in the unstructured natural language textual content of the corpus 345 or corpora 347 have been ingested in accordance with the ingestion priority plan 397 and the application of selection criteria by the structured data portion fact prioritization and ingestion engine 398, where the ingestion priority plan 397 is generated based on weighted priority scores associated with metadata elements in signatures of the structured data portions as generated by the elements 392-396 in the manner previous described above.

Figure 5:
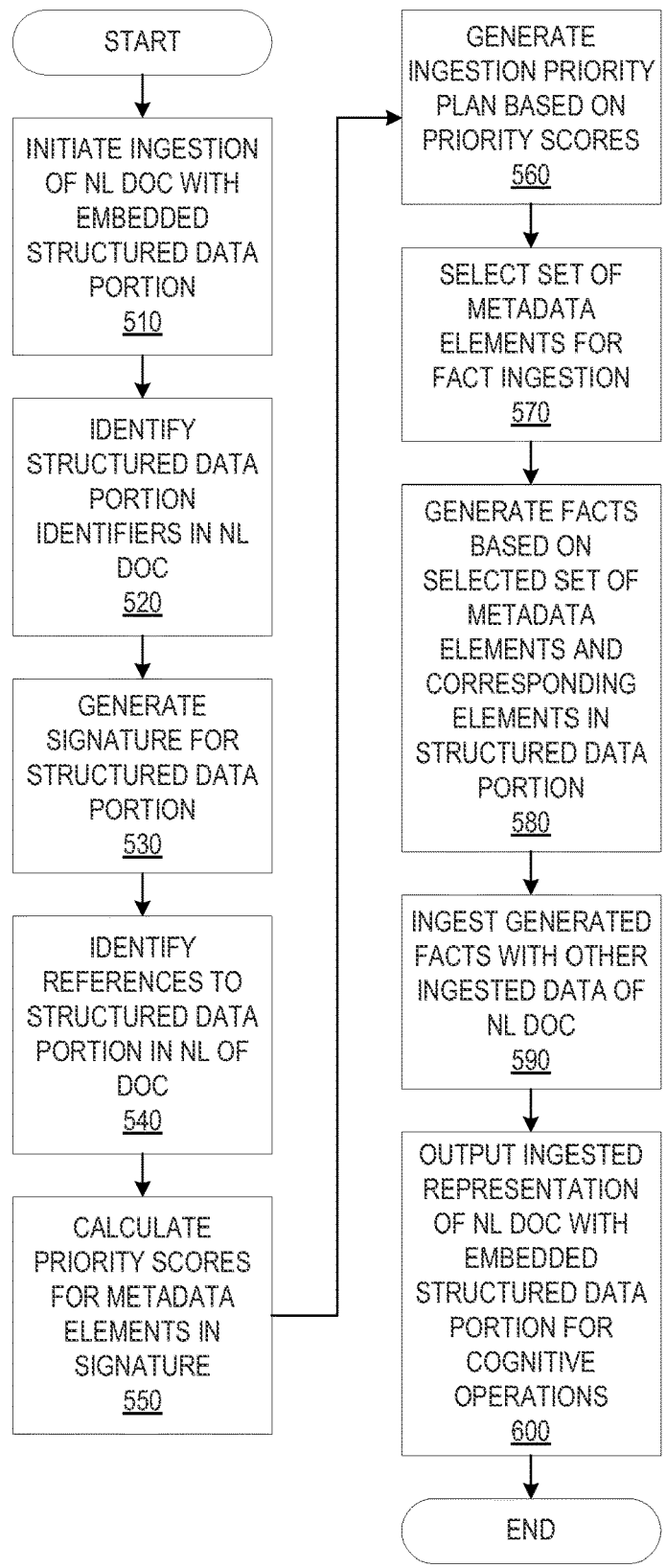
FIG. 5 is a flowchart outlining an example operation for prioritized ingestion of a subset of facts from embedded structured data in an unstructured natural language text document in accordance with one illustrative embodiment.

FIG. 5 is a flowchart outlining an example operation for prioritized ingestion of a subset of facts from embedded structured data in an unstructured natural language text document in accordance with one illustrative embodiment. For ease of explanation, the operation outlined in FIG. 5 is for the ingestion of a single natural language document having a single embedded structured data portion. It should be appreciated that this operation may be repeated for multiple embedded structured data portions and for multiple documents of a corpus that is being ingested. In the case where multiple embedded structured data portions are present in the same document, the considerations discussed above with regard to proximity of references to the various structure data portions may be utilized to associate references to the different structured data portions.

As shown in FIG. 5, the operation starts with the initiation of an ingestion operation to ingest a natural language document having an embedded structured data portion (e.g., table) (step 510). The document is analyzed to identify any structured data portion identifiers present in the document (step 520). For the identified structured data portion identifier, a signature is extracted from the corresponding structured data portion, where the signature comprises one or more metadata elements describing the configuration and/or content of the structured data portion (step 530). The natural language text content of the document and/or other documents in the same or different corpora, are analyzed to identify references to metadata elements in the signature of the structured data portion (step 540). Corresponding priority scores are calculated for each of the metadata elements of the signature based on an initial setting of the priority scores and any applicable modifications to the initial setting of the priority scores based on the identified references to the metadata elements in the natural language text content of the document or other documents in the same or different corpora (step 550).

An ingestion priority plan is generated based on the priority scores of the metadata elements in the signature of the structured data portion (step 560). A set of metadata elements, from which facts are to be generated for ingestion, are selected based on the ingestion priority plan and one or more selection criteria (step 570). The selected set of metadata elements are then used to identify portions of content within the structured data portion corresponding to the metadata elements and corresponding facts are generated based on the selected set of metadata elements and the corresponding content in the structured data portion (step 580). The generated facts are ingested and associated with other ingested data of an in-memory representation of the document (step 590). The ingested facts and other in-memory representation of the document are then output for use as a basis for performing a cognitive operation, such as answering a natural language question input to a QA system pipeline, for example, (step 600). The operation then terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory having instructions which, when executed by the processor, cause the processor to implement an ingestion engine for ingesting natural language textual content, the method comprising:
   initiating, by the ingestion engine, ingestion of natural language textual content;
   identifying, by the ingestion engine, an embedded structured data portion within the natural language textual content;
   generating, by the ingestion engine, a signature of the structured data portion, wherein the signature comprises one or more metadata elements describing the configuration or content of the structured data portion;
   identifying, by the ingestion engine, references to the structured data portion in natural language text portions of the natural language textual content;
   evaluating, by the ingestion engine, the references based on the signature of the structured data portion;
   generating, by the ingestion engine, an ingestion prioritization plan for ingesting a set of facts associated with a set of elements of the structured data portion based on results of the evaluation; and
   applying, by the ingestion engine, the ingestion prioritization plan to generate the set of facts and store the set of facts in an ingested representation of the natural language textual content.

2. The method of claim 1, wherein identifying an embedded structured data portion within the natural language textual content comprises analyzing the natural language textual content to identify at least one of metadata, identifiers, tags, or patterns of content in the natural language textual content that are indicative of an embedded structured data portion.

3. The method of claim 1, wherein generating a signature of the structured data portion comprises identifying at least one of a title of the structured data portion, headers of portions of the structured data portion, sheet names, formulas used to generate contents of the structured data portion, or cell contents.

4. The method of claim 1, wherein identifying references to the structured data portion in natural language text portions of the natural language textual content comprises performing natural language processing operations on the natural language textual content to identify patterns of content indicative of a reference to the structured data portion.

5. The method of claim 1, wherein evaluating the references based on the signature of the structured data portion comprises:
   calculating a priority score associated with metadata elements in the signature of the structured data portion based on identification of references to the metadata elements in the signature.

6. The method of claim 5, wherein evaluating the references based on the signature of the structured data portion further comprises:
   weighting contributions to the priority score of a metadata element based on characteristics of references to the metadata element such that different weights are applied to different references having different characteristics.

7. The method of claim 1, wherein generating the ingestion prioritization plan comprises:
   applying a priority score threshold to priority scores of the metadata elements of the signature to select a subset of metadata elements to be used to generate the set of facts; and
   identifying instances of elements in the embedded structured data portion that match the subset of metadata elements to be the set of elements from which the set of facts are generated.

8. The method of claim 1, wherein applying the ingestion prioritization plan to generate the set of facts and store the set of facts in an ingested representation of the natural language textual content further comprises applying an ingestion limit to the set of facts so as to limit a number of facts generated and stored in the ingested representation of the natural language content.

9. The method of claim 1, wherein the embedded structured data portion is an embedded table comprising at least one row and at least one column of information.

10. The method of claim 1, further comprising:
    performing a cognitive operation on the ingested representation of the natural language textual content.

11. A computer program product comprising a computer readable storage medium having a computer readable program stored therein, wherein the computer readable program, when executed on a computing device, causes the computing device to implement an ingestion engine for ingesting natural language textual content, the ingestion engine operating to:

initiate ingestion of natural language textual content;

identify an embedded structured data portion within the natural language textual content;

generate a signature of the structured data portion, wherein the signature comprises one or more metadata elements describing the configuration or content of the structured data portion;

identify references to the structured data portion in natural language text portions of the natural language textual content;

evaluate the references based on the signature of the structured data portion;

generate an ingestion prioritization plan for ingesting a set of facts associated with a set of elements of the structured data portion based on results of the evaluation; and apply the ingestion prioritization plan to generate the set of facts and store the set of facts in an ingested representation of the natural language textual content.

12. The computer program product of claim 11, wherein identifying an embedded structured data portion within the natural language textual content comprises analyzing the natural language textual content to identify at least one of metadata, identifiers, tags, or patterns of content in the natural language textual content that are indicative of an embedded structured data portion.

13. The computer program product of claim 11, wherein generating a signature of the structured data portion comprises identifying at least one of a title of the structured data portion, headers of portions of the structured data portion, sheet names, formulas used to generate contents of the structured data portion, or cell contents.

14. The computer program product of claim 11, wherein identifying references to the structured data portion in natural language text portions of the natural language textual content comprises performing natural language processing operations on the natural language textual content to identify patterns of content indicative of a reference to the structured data portion.

15. The computer program product of claim 11, wherein evaluating the references based on the signature of the structured data portion comprises:

calculating a priority score associated with metadata elements in the signature of the structured data portion based on identification of references to the metadata elements in the signature.

16. The computer program product of claim 15, wherein evaluating the references based on the signature of the structured data portion further comprises:

weighting contributions to the priority score of a metadata element based on characteristics of references to the metadata element such that different weights are applied to different references having different characteristics.

17. The computer program product of claim 11, wherein generating the ingestion prioritization plan comprises:

applying a priority score threshold to priority scores of the metadata elements of the signature to select a subset of metadata elements to be used to generate the set of facts; and identifying instances of elements in the embedded structured data portion that match the subset of metadata elements to be the set of elements from which the set of facts are generated.

18. The computer program product of claim 11, wherein applying the ingestion prioritization plan to generate the set of facts and store the set of facts in an ingested representation of the natural language textual content further comprises applying an ingestion limit to the set of facts so as to limit a number of facts generated and stored in the ingested representation of the natural language content.

19. The computer program product of claim 11, wherein the embedded structured data portion is an embedded table comprising at least one row and at least one column of information.

20. An apparatus comprising:

a processor; and a memory coupled to the processor, wherein the memory comprises instructions which, when executed by the processor, cause the processor to implement an ingestion engine for ingesting natural language textual content, the ingestion engine operating to:

initiate ingestion of natural language textual content;

identify an embedded structured data portion within the natural language textual content;

generate a signature of the structured data portion, wherein the signature comprises one or more metadata elements describing the configuration or content of the structured data portion;

identify references to the structured data portion in natural language text portions of the natural language textual content;

evaluate the references based on the signature of the structured data portion;

generate an ingestion prioritization plan for ingesting a set of facts associated with a set of elements of the structured data portion based on results of the evaluation; and apply the ingestion prioritization plan to generate the set of facts and store the set of facts in an ingested representation of the natural language textual content.

\* \* \* \* \*